(12) United States Patent
Taquet et al.

(10) Patent No.: US 9,434,647 B2
(45) Date of Patent: Sep. 6, 2016

(54) AQUEOUS SUSPENSIONS INCLUDING AN ALUMINOUS CEMENT AND BINDING COMPOSITIONS

(71) Applicants: Pascal Taquet, Grenay (FR); Pierre-Antoine Andreani, Estrablin (FR); Veronique Watt, Saint Jean de Soudain (FR); Emilie Reveyrand, Vezeronce Curtin (FR)

(72) Inventors: Pascal Taquet, Grenay (FR); Pierre-Antoine Andreani, Estrablin (FR); Veronique Watt, Saint Jean de Soudain (FR); Emilie Reveyrand, Vezeronce Curtin (FR)

(73) Assignee: KERNEOS, Neuilly-sur-Seine (FR)

( * ) Notice: Subject to any disclaimer, the term of this patent is extended or adjusted under 35 U.S.C. 154(b) by 0 days.

(21) Appl. No.: 14/366,779

(22) PCT Filed: Dec. 19, 2012

(86) PCT No.: PCT/FR2012/052999
§ 371 (c)(1),
(2) Date: Jun. 19, 2014

(87) PCT Pub. No.: WO2013/093344
PCT Pub. Date: Jun. 27, 2013

(65) Prior Publication Data
US 2014/0343194 A1 Nov. 20, 2014

(30) Foreign Application Priority Data
Dec. 19, 2011 (FR) ..................... 11 61918

(51) Int. Cl.
*C04B 22/16* (2006.01)
*C04B 28/06* (2006.01)
*C04B 103/22* (2006.01)

(52) U.S. Cl.
CPC ............ *C04B 22/165* (2013.01); *C04B 28/06* (2013.01); *C04B 28/065* (2013.01); *C04B 2103/22* (2013.01)

(58) Field of Classification Search
CPC ... C04B 22/165; C04B 28/06; C04B 28/065; C04B 2103/22
See application file for complete search history.

(56) References Cited

U.S. PATENT DOCUMENTS

| 5,629,452 | A | 5/1997 | Mosquet et al. |
| 5,879,445 | A | 3/1999 | Guicquero et al. |
| 2003/0127026 | A1 | 7/2003 | Anderson et al. |
| 2004/0049174 | A1 | 3/2004 | Peyman |
| 2004/0099185 | A1 | 5/2004 | Gaudry et al. |
| 2004/0211562 | A1 | 10/2004 | Brothers et al. |
| 2004/0211564 | A1 | 10/2004 | Brothers et al. |
| 2006/0118006 | A1 | 6/2006 | Amathieu et al. |
| 2008/0302276 | A1 | 12/2008 | Perez-Pena et al. |
| 2010/0175589 | A1 | 7/2010 | Charpentier et al. |
| 2011/0034572 | A1 | 2/2011 | Mueller |
| 2011/0281241 | A1* | 11/2011 | Pandolfelli .......... A61K 6/0276 433/224 |

FOREIGN PATENT DOCUMENTS

| CN | 102026938 | | 4/2011 |
| EP | 0 081 385 | A1 | 6/1983 |
| EP | 0 113 593 | A2 | 7/1984 |
| EP | 0 241 230 | A1 | 10/1987 |
| EP | 1 659 101 | A1 | 5/2006 |
| FR | 2689895 | | 10/1993 |
| FR | 2696736 | A1 | 4/1994 |
| FR | 2763937 | A3 | 12/1998 |
| FR | 2810314 | A1 | 12/2001 |
| FR | 2918055 | A1 | 1/2009 |
| JP | 2007 254196 | A | 10/2007 |
| KR | 100 913 496 | B1 | 8/2009 |

OTHER PUBLICATIONS

International Search Report, dated Feb. 15, 2013, from corresponding PCT application.

* cited by examiner

*Primary Examiner* — John Uselding
(74) *Attorney, Agent, or Firm* — Young & Thompson

(57) ABSTRACT

Stabilized aqueous suspensions include aluminous cement and/or calcium sulfoaluminous cement and binding compositions including the aqueous suspension in combination with organic binders, which are stable at room temperature and at high temperature as well as methods for preparing the same are described.

27 Claims, 6 Drawing Sheets

US 9,434,647 B2

AQUEOUS SUSPENSIONS INCLUDING AN ALUMINOUS CEMENT AND BINDING COMPOSITIONS

FIELD OF THE INVENTION

The present invention relates to aqueous suspensions comprising aluminous cement and/or calcium sulfoaluminous cement and to binding compositions comprising said aqueous suspension in combination with organic binders, which are stable at room temperature and at high temperature, as well as the methods for preparing the same.

DESCRIPTION OF THE BACKGROUND ART

Aqueous suspensions comprising hydraulic binders that are commonly called "slurry" come in the form of more or less fluid suspensions. The advantage of such suspensions is that they form ready to use solutions to be directly employed in any application for construction chemistry such as adhesive formulation, soil preparation, floor covering, tile flooring, wall preparation, exterior rendering, concrete repairs, ready-mixed concretes, shotcretes, sewerage systems, waterproofing, road repair works, binding, anchorage devices, paints and coatings and prefabrication and refractory and peri-refractory applications.

Stabilization consists in stopping hydration of the hydraulic binder by adding a blocking agent (or inhibitor). Amongst known blocking agents, boric acid and salts thereof reveal particularly efficient for stabilizing hydraulic binder-based aqueous suspensions comprising aluminous cement.

The patents EP 0241 230, EP 0 113 593, the patent application EP 0081385 and the French certificate of utility FR 2763937 disclose, for example, compositions comprising an aluminous cement in aqueous phase which has been retarded for several months through addition of boric acid, or a salt thereof, being suspended in water.

However, using such a blocking agent has some drawbacks. The aluminous cement aqueous suspensions are not stable for sufficient periods of time at high temperature. This phenomenon is even more marked when these aqueous suspensions are associated with resins or organic binders. This phenomenon gets worse when the aqueous suspension is used in high proportions as compared to the aqueous suspension—organic binder mixture.

Another drawback of boric acid is that it is quite toxic and ecotoxic as well.

US 2004/211562 and US 2004/211564 disclose cement composition comprising by weight/weight$_{non\ hydrated\ cement}$: 20 to 80% of calcium aluminate; 20 to 80% of a silica source (fly ash); 1 to 10% of a soluble phosphate like sodium polyphosphate, sodium hexamethaphosphate, sodium phosphate or a mixture thereof; 0.1 to 5% of a set retarder (carboxylic acid like citric acid; tartaric acid); and 30 to 50% of water to obtain pumpable slurry. The function of the soluble phosphate is to improve the corrosion resistance of the cement composition. The examples in US 2004/211562 show that the set retarders tested retard the hydration of the cement compositions up to a maximum of 16 hours.

Thus, the use of a carboxylic acid as blocking agent does not provide aqueous suspensions of aluminous cement which are stable for a sufficient period of time, such as for example, one month.

JP 2007/254196 discloses a hydraulic composition comprising: aluminous cement, Portland cement, gypsum (the total of the three components is 100 parts by weight), water and optionally, a set modifier. The set modifier is sodium pyrophosphate ($Na_4P_2O_7$) and/or sodium tartrate.

KR 100 913 496 discloses a dry concrete composition for paving to improve drainage and water retention. The composition comprises a binder and aggregates having a mean diameter between 2.5 and 5 mm. In particular, the binder is a dry composition based on a calcium sulfoaluminate clinker, gypsum, an intensity accelerator selected for example from alkaline metal carbonates or bicarbonates and a retarder.

US 2008/302276 discloses a cement composition in the form of a rapid set aqueous composition comprising: active hydraulic cement (Portland cement, calcium aluminate, calcium sulfate and fly ashes), set accelerators, water and optionally, set retarders selected from citric acid, sodium citrate, sodium tartrate or potassium tartrate. The set accelerators are selected from a mixture of an alkanolamine and a phosphate or polyphosphate (sodium trimetaphosphate, sodium or potassium tripolyphosphate, tetrapotassium or tatrasodium pyrophosphate) that act in synergy. The rapid set of the aqueous composition occurs by mixing the different components at a temperature above 32.2° C.

Therefore, it is necessary to find new blocking agents for aqueous suspensions comprising aluminous cement and/or calcium sulfoaluminous cement which would not suffer from the hereinabove mentioned drawbacks.

SUMMARY OF THE INVENTION

It is therefore an object of the present invention to provide aluminous cement and/or calcium sulfoaluminous cement based aqueous suspensions with the following properties:
- they have a high lifetime, that is to say the aqueous suspensions should not set when they are stored at a temperature ranging from about 15° C. (room temperature) to 55° C. (high temperatures), for a period ranging from a couple of weeks to several months, preferably for at least one month, more preferably two months or more and most preferably for at least 6 months, so as to be protected against any storage or delivery delay, and
- they remain fluid and do not segregate, especially during transport, so that the implementation on site can be guarantied,
- they may be associated in high amounts with organic resins without setting,
- they are poorly toxic and ecotoxic.

As used herein, <<lifetime>> is intended to mean the time during which a component remains in the form of an aqueous suspension of stable solid products, but is able to come back to an aqueous suspension state through a simple mechanical stirring, without setting.

As used herein, <<stable>> is intended to mean that the aqueous suspension viscosity does not change much during storage and that the system does not set. One amongst the indicators used to monitor the stability of the mixture is the pH value of the suspension. This one should remain relatively constant during the storage period. Any increase in the pH value may be interpreted as a beginning of <<destabilization>> of the suspension.

Thus, the object of the invention consists in a stabilized aqueous suspension comprising:
- at least one hydraulic binder comprising an aluminous cement and/or calcium sulfaluminous cement and
- at least one blocking agent comprising a phosphorus-containing compound selected from metaphosphoric acid, phosphorous acid, phosphoric acid, phosphonic acid and any compound which may form any of these compounds by reacting with water, said suspension comprising from 0.1% to 20%, preferably from 0.1 to 15%, preferably from 0.1 to 10% and more preferably from 0.3 to 10% by weight of phosphorus-containing compound relative to the total weight of aluminous cement and/or calcium sulfoaluminous cement.

The applicant discovered surprisingly that the above mentioned phosphorus-containing compounds could very efficiently replace boric acid for stabilizing aqueous suspensions comprising aluminous cements and/or calcium sulfoaluminous cements. These compounds enable especially:

- to obtain a good level of stabilization at room temperature,
- to significantly improve stabilization of aqueous suspensions at high temperature,
- to associate in any proportions such stabilized aqueous suspensions with organic binders, for example of the latex type.

The object of the invention also consists in a method for making an aqueous suspension such as described above, comprising successively the following steps:

- introducing water into a mixing tank,
- stirring,
- adding the phosphorus-containing compound,
- optionally adding the one or more dispersing agent(s),
- adding the one or more hydraulic binder(s),
- maintaining the stirring and,
- optionally adding the other components,
- stirring for at least 5 minutes.

The invention also relates to a method for retarding the setting of an aqueous suspension comprising a hydraulic binder, said hydraulic binder comprising at least one aluminous cement, characterized in that it consists in adding to said aqueous suspension at least one blocking agent comprising a phosphorus-containing compound selected from metaphosphoric acid, phosphorous acid, phosphoric acid, phosphonic acids and any compound which may form any of these compounds by reacting with water, said phosphorus-containing compound representing from 0.1 to 20% by weight relative to the total weight of the aluminous cement.

The present invention further relates to a binding composition comprising:
(i) an aqueous suspension such as described above and
(ii) at least one organic binder.

DETAILED DESCRIPTION OF THE INVENTION

Figure 1:
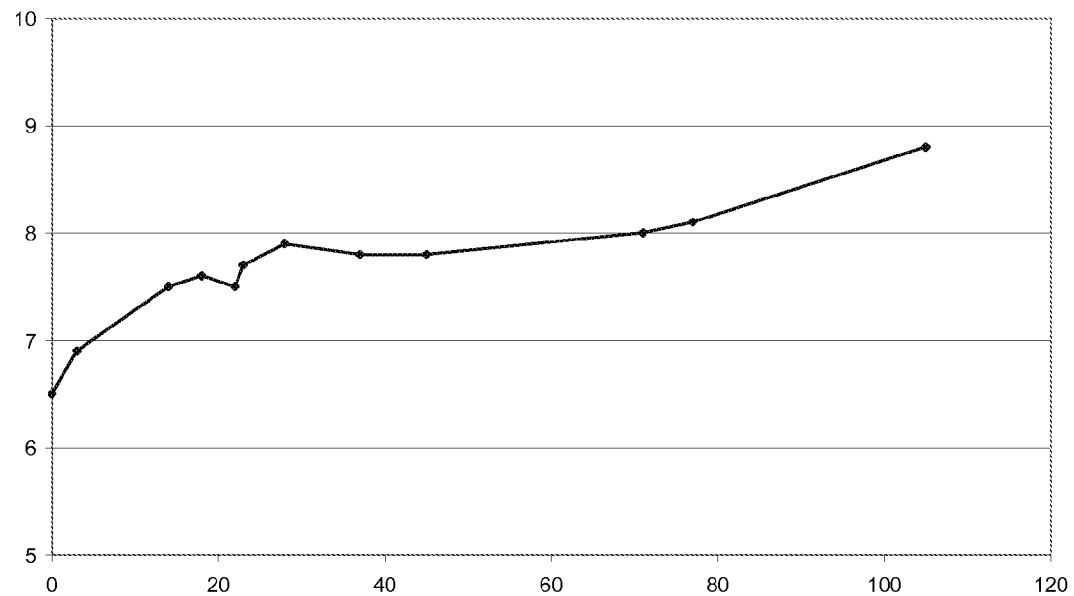
FIG. 1 shows the pH evolution of an aqueous suspension kept at room temperature.

According to the invention, aluminous cements are combinations of aluminum oxide $Al_2O_3$, noted A in the cement nomenclature, with calcium oxide CaO, noted C in the cement nomenclature, which are combined with one or more crystalline and/or amorphous phases, in such amounts that the weight addition of phases C+A is at least 20% to 100% of aluminous cement total weight.

According to the invention, it is considered that aluminous cement has a high alumina content when its alumina content is higher than 60% by weight relative to the aluminous cement total weight.

According to the invention, it is considered that aluminous cement has an intermediate alumina content when its alumina content ranges from 45% to 60% by weight relative to the aluminous cement total weight.

According to the invention, it is considered that aluminous cement has a low alumina content when its alumina content is lower than 45% by weight relative to the aluminous cement total weight.

According to the invention, calcium sulfoaluminous compounds or cements correspond to compounds comprising calcium oxide (CaO, noted C in the cement nomenclature), aluminum oxide ($Al_2O_3$, noted A in the cement nomenclature) and sulfur oxide (noted S in the cement nomenclature) combined with one or more crystalline and/or amorphous phases, in such amounts that the weight addition of phases C+A+S is at least 10% to 100% of the calcium sulfoaluminous compound total weight.

The invention therefore relates to a stabilized aqueous suspension comprising:
- at least one hydraulic binder comprising aluminous cement and/or calcium sulfoaluminous cement and
- at least one blocking agent based on a phosphorus-containing compound selected from metaphosphoric acid, phosphorous acid, phosphoric acid, phosphonic acid and any compound which may form any of these compounds by reacting with water, said suspension comprising from 0.1% to 20%, preferably from 0.1 to 15%, preferably from 0.1 to 10%, and more preferably from 0.3 to 10% by weight of the phosphorus-containing compound relative to the aluminous cement and/or calcium sulfoaluminous cement total weight.

Preferably, the amounts of aluminous cement and/or of sulfoaluminous cement by weight relative to the hydraulic binder total weight are higher than any of the following values: 50%, 60%, 70%, 80%, 90%, 95%, 99% or are 100%.

According to alternative embodiments of the invention, the aqueous suspension may comprise:
- at least one phosphonic acid and at least one compound selected from metaphosphoric acid, phosphorous acid, phosphoric acid and any compound which may form any of these compounds by reacting with water,
- in addition, a further blocking agent, where said further blocking agent may be selected from mineral acids such as boric acid and salts thereof and from carboxylic acids, the carboxylic acids being preferably selected from citric acid, tartaric acid, aminoacids (such as aspartic acid and glutamic acid), mandelic acid, humic acid, fulvic acid, quinic acid, a combination:
- of at least one phosphonic acid,
- of at least one compound selected from metaphosphoric acid, phosphorous acid, phosphoric acid and any compound which may form any of these compounds by reacting with water and
- of at least one carboxylic acid.

When the aqueous suspension further comprises a blocking agent different from a phosphorus-containing compound such as carboxylic acid, this or these blocking agent(s) represent(s):
- from 0.3 to 5%, preferably from 0.3 to 2.5% by weight of the aqueous suspension total weight or
- from 0.3 to 9%, preferably from 0.5 to 5% by weight of the hydraulic binder total weight.

It will be easily understood that when the suspension further comprises a blocking agent different from a phosphorus-containing compound, the amounts of the phosphorus-containing compounds may be minimum because of the presence of this additional blocking agent.

Therefore, in an advantageous embodiment of the invention, the stabilized aqueous suspension may comprise:
- from 0.1 to 20%, preferably from 0.1 to 15%, preferably from 0.1 to 10%, and more preferably from 0.3 to 10% by weight of phosphorus-containing compound relative to the aluminous cement and/or calcium sulfoaluminous cement total weight,
- from 0.3 to 9%, preferably from 0.5 to 5% by weight of a blocking agent different from a phosphorus-containing compound relative to hydraulic binder total weight.

It is particularly interesting to note that the phosphorus-containing compounds used as blocking agents according to the invention enable to stabilize all types of aluminous cements but that they are particularly efficient when the aluminous cement used is an alumina high-content cement. Indeed, the applicant discovered that the minimum optimal amounts of phosphorus-containing compounds to obtain a good stabilization are inversely proportional to the alumina content in the hydraulic binder or in aluminous and/or calcium sulfoaluminous cement. Moreover, with alumina high-content aluminous cements, a stabilization can be obtained that may last for over 6 months even if the aqueous suspensions are stored at 50° C.

Depending on the aluminous cement type in the hydraulic binder, the aqueous suspension of the invention is preferably defined as follows:
when the aluminous cement is an alumina high-content aluminous cement with an alumina content of more than 60% by weight relative to the aluminous cement total weight, the suspension comprises from 0.5 to 20%, preferably from 0.5 to 15%, preferably from 0.5 to 10%, preferably from 0.5 to 5% and more preferably from 0.5 to 2% by weight of phosphorus-containing compound relative to the total weight of alumina high-content aluminous cement,
when the aluminous cement is an alumina intermediate-content aluminous cement with an alumina content ranging from 45 to 60% by weight relative to the aluminous cement total weight, the suspension comprises from 2 to 20%, preferably from 2 to 15%, preferably from 2 to 10%, preferably from 3 to 7% and more preferably from 3 to 5% of phosphorus-containing compound relative to the total weight of alumina intermediate-content aluminous cement,
when the aluminous cement is an alumina low-content aluminous cement with an alumina content of less than 45% by weight relative to the aluminous cement total weight, the suspension comprises from 5 to 20%, preferably from 5 to 15%, preferably from 5 to 10%, preferably from 6 to 9% and more preferably from 8 to 9% by weight of phosphorus-containing compound relative to the total weight of alumina low-content aluminous cement, Preferably, the suspension comprises, by weight relative to the total weight of said aqueous suspension:
- from 20 to 80%, preferably from 50 to 70% and more preferably from 55 to 65% of aluminous cement, and/or
- from 20 to 60%, preferably from 30 to 50% and more preferably from 35 to 45% of water, and/or
- from 0 to 5% of additional additives.

According to the invention, the phosphorus-containing compound acting as a blocking agent may be selected from:
- metaphosphoric acid of raw formula $HPO_3$ (CAS registry number: 37267-86-0),
- phosphorous acid, also called orthophosphoric acid, chemical compound of formula $H_3PO_3$ (CAS registry number: 10294-56-1),
- phosphoric acid of formula $H_3PO_4$ (CAS registry number: 7664-38-2),
- phosphonic acids of formula $HP(=O)(OH)_2$ and P-hydrocarbyl derivatives thereof (definition from <<Compendium de terminologie chimique, Recommandations IUPAC>>, Jean-Claude Richer),
- any compound which may form any of these compounds by reacting with water.

"Compounds which may form any of these compounds by reacting with water" can especially correspond to compounds able to directly form in contact with water metaphosphoric acid, phosphorous acid, phosphoric acid, phosphonic acid and hydronium ions ($H_3O^+$), the phosphorous acid being capable of converting into metaphosphoric acid in contact with water.

To be mentioned are the following compounds that may hydrolyze to phosphoric acid:
- phosphorus pentoxide or phosphoric anhydride of raw formula $P_4O_{10}$ (CAS registry number: 1314-56-3),
- pyrophosphoric acid, also called diphosphoric acid, a chemical compound of formula $H_4P_2O_7$, (CAS registry number: 2466-09-3),
- tripolyphosphoric acid of raw formula $H_5P_3O_{10}$, which may hydrolyze to phosphoric acid (CAS registry number: 10380-08-2).

To be mentioned are especially the following compounds amongst the hydrocarbyl derivatives to be suitably used in the invention: amino trimethylene phosphonic acid (ATMP, No CAS 6419-19-8), AEPN: 2-aminoethyl phosphonic acid, HEDP: 1-hydroxy ethylidene-1,1-diphosphonic acid, EDTMP: ethylene diamine tetramethylene phosphonic acid, TDTMP: tetramethylene diamine tetramethylene phosphonic acid, HDTMP: hexamethylene diamine tetramethylene phosphonic acid, DTPMP: diethylenetriamine pentamethylene phosphonic acid, PBTC: phosphonobutane-tricarboxylic acid, PMIDA: N-(phosphonomethyl)iminodiacetic acid, CEPA: 2-carboxyethyle phosphonic acid, HPAA: 2-hydroxyphosphonocarboxylic acid.

As it will be demonstrated in the example part below, the phosphorus-containing compound, acting as a blocking agent, thus enables at relatively low doses, to block the dissolution of the aluminous cement-based aqueous suspension. The aqueous suspension is thus stabilized over extended periods of time (of more than 1 month) and including at relatively high temperatures (for example 50° C.).

The phosphorus-containing compound also enables to significantly lower the pH value of the aqueous suspension. Advantageously, the pH value of said stabilized aqueous suspension is less than 9, more advantageously less than 8 and in particular less than 7, especially less than 6.5.

According to certain embodiments, the phosphorus-containing compound has a pka of less than 9, especially less than 8, in particular, such compounds suitable for the implementation of the invention may have a pka of less than 7, or less than 6.8.

However, as described hereinabove, blocking agents described in the background art, such as carboxylic acids or phosphate salts, do not enable to block the dissolution of the hydraulic binder over periods of time as long as those of the phosphorus-containing compound according to the invention.

For example, the Applicant calculated that an aqueous suspension comprising by weight/weight of the total suspension:
58.5% of calcium aluminates, 36.5% of water, 3.7% of sodium tripolyhposphate and 1.3% of other additives, or
57% of calcium aluminates, 35.7% of water, 6.1% of sodium hexametaphosphate (HMPNa) and 1.2% of other additives, or
58.4% of calcium aluminates, 36.5% of water, 3.9% of trisodium phosphate and 1.2% of other additives, or
58.5% of calcium aluminates, 36.6% of water, 3.6% of hydrogenophosphate and 1.3% of other additives,
enabled to block the hydraulic setting over, respectively, only less than 18 hours at 50° C. and 2 days at room temperature (25° C.); less than 17 hours at 50° C. or at room temperature; less than 18 hours at 50° C. and less than 48 hours at room temperature; less than 24 hours at 50° C. and less than 4 days at room temperature.

Additives in the suspensions comprise for example dispersants or thickenings known to those skilled in the art.

Also, the Applicant calculated that tartaric acid or citric acid enables to stabilize a hydraulic cement-based aqueous suspension (calcium aluminate or sulfoaluminate) only during 18 hours at 50° C. and 6 days at room temperature (25° C.).

The blocking agent comprising the phosphorus-containing compound according to the invention has therefore an unexpected and surprising effect compared to the blocking agents described in the background art.

When the aluminous cement is alumina high-content cement, it is considered that to obtain a lifetime of at least six months, preferably about 1 to 10% by weight of phosphorus-containing compound relative to the aluminous cement total weight is required.

Preferably, the alumina high-content aluminous cement used according to the invention has an alumina content ranging from 65% to 75% and more preferably ranging from 68% to 72% by weight relative to the aluminous cement total weight.

Preferably, the chemical composition of the alumina high-content aluminous cement, defined by weight relative to the aluminous cement total weight is the following one:
$Al_2O_3$: >60%, preferably 60-75%,
CaO: >25%, preferably 25-50%,
$SiO_2$: <5%, preferably <4% and more preferably <2%,
$Fe_2O_3$: <10%, preferably <5% and more preferably <1%.

Aluminous cements typically comprise a crystallized mineralogical phase selected from CA, C12A7, C3A, CA2, C2AS, ferrites; an amorphous phase or a mixture of one or more of said crystallized mineralogical phases and/or an amorphous phase.

According to the invention, the hydraulic binder may further comprise calcium sulphates. Calcium sulphates may be derived from a compound selected from anhydrites, semi-hydrates of the plaster type, gypsum, or mixtures thereof.

The aqueous suspension may comprise, by weight relative to the aqueous suspension total weight, from 0 to 50%, preferably from 5 to 30% of calcium sulphate.

The combined use of aluminous cement and calcium sulphates may form an ettringite binder. As used herein, an ettringite binder is intended to mean a binder which components, upon hydrating under the normal conditions of use, give ettringite as the main hydrate, which is calcium trisulfoaluminate of formula $3CaO.Al_2O_3.3CaSO_4.32H_2O$.

In an embodiment of the present invention, the aqueous suspension comprises a hydraulic binder comprising by weight relative to the total weight of the hydraulic binder-forming components:
from 0 to 50%, preferably from 1 to 35 and more preferably from 5 to 30% of calcium sulphates,
from 50 to 100%, preferably from 50 to 99% and more preferably 70 to 95% of aluminous cement.

Aluminous or calcium sulfoaluminous cements used according to the invention preferably have a Blaine surface area higher than or equal to 1500 $cm^2/g$, preferably ranging from 2000 to 6000 $cm^2/g$ and more preferably ranging from 3000 to 4500 $cm^2/g$.

The aqueous suspension may also comprise additional additives. These additives are preferably selected from dispersants, rheological agents and biocidal agents but may also include superplasticizers, anti-foaming agents and thickeners.

To be mentioned as a suitable dispersant for use in the present invention are Sokalan® CP10, marketed by the BASF company, Optima®206 or Premia®196 marketed by the Chryso company. The dispersant typically represents:
from 0.1 to 3%, preferably from 0.5 to 1% by weight of the aqueous suspension total weight or
from 0.1 to 5%, preferably from 0.6 to 1.8% by weight of the hydraulic binder total weight.

The rheological agent(s) are preferably selected from organic products such as xanthan gum, welan gum, DIUTAN® gum, starch-derived ethers, guar-derived ethers, polyacrylamide, carrageenan, agar agar, or mineral products such as clays (bentonite for example) and their mixtures.

The rheological agent(s) typically represent(s):
from 0.1 to 1%, preferably from 0.25 to 0.5% by weight of the aqueous suspension total weight or
from 0.2 to 2%, preferably from 0.25 to 3.4% by weight of the hydraulic binder total weight.

The composition of the invention may also comprise an antibacterial agent. Suitable antibacterial or biocidal agents for use in the present invention include compounds of the isothiazolinone family, such as methylisothiazolinone (MIT) and benzisothiazolinone (BIT) as well as combinations thereof. To be mentioned are especially ECOCIDE@ K35R, marketed by the PROGIVEN company and Nuosept® OB03 marketed by the ISP company. The antibacterial agent then preferably represents:
from 0.005 to 0.1%, preferably from 0.01 to 0.02% by weight of the aqueous suspension total weight or from 0.01 to 0.2%, preferably from 0.02 to 0.04% by weight of the hydraulic binder total weight.

Superplasticizers are preferably selected in the family constituted of polyphosphonate-polyox, polycarboxylate-polyox PCP and polyacrylates or copolymers of acrylic acids and alkoxy-acrylic acids, and their mixtures. Polycarboxylate-polyox type superplasticizers are known compounds which are especially described in the patents US 2003/0127026 and US 2004/049174. Polyphosphonate-polyox compounds are especially described in the patents FR-A-2810314 and FR-A-2696736, as well as FR-A-2689895. These superplasticizers are products which are commercially available. To be mentioned as an example are OPTIMA 100® and PREMIA 150®, marketed by the CHRYSO company, or MELMENT F10®, MELFLUX® marketed by the SKW company or Sokalan® CP 10 marketed by the BASF company.

Other additional additives such as antifoaming agents like Defoam® 50PE marketed by the Peramin company, may be introduced into the aqueous suspension formulation.

The solid content of the aqueous suspension is thus preferably higher than 50% and more preferably ranging from 55 to 80%.

The aqueous suspension of the invention may be associated with organic binders so as to form binding compositions.

The invention therefore also relates to a binding composition comprising:
(i) an aqueous suspension such as defined hereinabove and
(ii) at least one organic binder.

Preferably, this binding composition may comprise, by weight relative to the (i) and (ii) component total weight:
from 10 to 90% of an aqueous suspension,
from 10 to 90% of an organic binder.

Organic binders used according to the invention are preferably polymer resins comprising polymers and copolymers of the latex type.

Lastly, the aqueous suspension of the invention may be associated with fillers to form other compositions. These compositions thus comprise:
(i) an aqueous suspension such as defined hereinabove and
(ii) at least one filler.

Fillers may be mineral or organic in nature and selected from siliceous compounds (sand, quartz, fumed silica), carbonate compounds (calcium carbonate, dolomite), pigments, titanium oxides, light fillers like perlite or vermiculite.

Preferably, the fillers represent from 1 to 50%, preferably from 10 to 30% by weight of the composition total weight. The remainder is made of the aqueous suspension.

To initiate the aqueous suspension or binding composition setting, a pH modifier simply has to be added so as to increase the pH value in the medium at a value higher than 9, preferably higher than 7 (beyond this value, the higher the pH value, the more rapid is the kinetic of the unbloking reaction) and thus makes inoperative the blocking agent of the aluminous or calcium sulfo-aluminous cement with optionally an additional lithium source.

The possible combinations are exemplified in the patent FR 2 918 055 which describes an initiating system based on lithium, lithium hydroxide and lithium sulfate or carbonate or in the patent FR 2 763 937, which describes an initiating system associating hydrated lime with a sodium and fluoride, sulfate or carbonate salt. Other combinations may be envisaged. Sodium or potassium hydroxide or sodium aluminate may be especially used as a pH modifier, in combination with an accelerator such as a lithium salt or a sodium or potassium salt, of the sulfate, carbonate, chloride or fluoride type.

The present invention further relates to a method for making an aqueous suspension such as previously mentioned.

According to the invention, this method comprises successively the following steps of:
introducing water into a mixing tank,
stirring preferably at a rate higher than 600 rpm, preferably higher than 800 rpm and more preferably of 1000 rpm, preferably with a rayneri stirring comprising a deflocculating blade,
adding the phosphorus-containing compound and preferably mixing until dissolution is complete,
optionally adding the one or more dispersant(s),
adding the one or more hydraulic binder(s), preferably gradually,
maintaining stirring and preferably increasing the stirring speed over 1000 rpm, preferably 3000 rpm,
optionally adding the other components, that is to say optionally the one or more rheological agent(s) and biocidal agent(s),
stirring for at least 5 minutes, preferably for 10 to 15 minutes.

When the aqueous suspension is associated with an organic binder to form a binding composition, the organic binders are preferably added under stirring, either directly at the end of the preparation of the aqueous suspension, or by simply mixing a posteriori, preferably at a rate of 600 rpm. The method for preparing the binding composition comprises, as compared to the method for preparing the aqueous suspension, an additional step of adding organic binders under stirring, either directly once the aqueous suspension preparation has been completed, for example when introducing the other components, or by simply mixing a posteriori.

The invention can be used for example as a surface coating obtained from the aqueous suspension defined hereinabove.

Lastly, the present invention relates to a method for retarding the setting of an aqueous suspension comprising a hydraulic binder, the hydraulic binder comprising at least one aluminous cement, characterized in that it consists in adding to said aqueous suspension, at least one blocking agent comprising a phosphorus-containing compound selected from metaphosphoric acid, phosphorous acid, phosphoric acid, phosphonic acids and any compound which may form any of these compounds by reacting with water, said phosphorus-containing compound representing from 0.1 to 20%, preferably from 0.1 to 15%, preferably from 0.1 to 10%, and more preferably from 0.3 to 10% by weight relative to the aluminous cement total weight.

According to this method, the aqueous suspension may have all the characteristics as defined hereabove.

The method for retarding the aqueous suspension setting also enables to retard the setting of a binding composition.

The invention therefore further relates to a method for retarding the setting of a binding composition comprising:
i) an aqueous suspension comprising a hydraulic binder, the hydraulic binder comprising at least one aluminous or calcium sulfoaluminous cement, and
ii) at least one organic binder.

In this instance, the method consists in adding to said aqueous suspension, at least one phosphorus-containing compound selected from metaphosphoric acid, phosphorous acid, phosphoric acid, phosphonic acids and any compound which may form any of these compounds by reacting with water, said phosphorus-containing compound representing from 0.1 to 20%, preferably from 0.1 to 15%, preferably from 0.1 to 10%, and more preferably from 0.3 to 10% by weight relative to the aluminous and/or calcium sulfoaluminous cement total weight.

The following examples, without being limitative, illustrate the present invention.

EXAMPLE

A. Preparation of the Compositions

I. Products Used
1. Introduction

| Function | Nature | Product |
|---|---|---|
| Solvent | Water | water |
| Blocking agent | Acid | Boric acid |
| | | Phosphoric acid |
| Dispersant | Sodium polyacrylate | Sokalan ® CP10 |
| Aluminous cement | Calcium aluminate | Ternal ® White |
| | | Ternal ® RG |
| | | Ternal ® EV |
| | | Secar ® 51 |
| | | Fondu ® Fos |
| Calcium sulphate | Anhydrite | |
| | Semihydrate | |
| Rheological agent | Xanthan gum | Rhodopol ® G |
| Biocidal agent | isothiazolinones | Ecocide ® K35R |
| | | Nuosept ® OB03 |
| Organic binder | acrylic styrene | Acronal ® S 790 BASF |

2. Chemical and Mineralogical Composition of the Cements

| | Ternal ® White | Ternal ® RG | Secar ® 51 | Fondu ® |
|---|---|---|---|---|
| Mineralogical phases* | | | | |
| C12A7/CA | <0.03 | <0.06 | — | — |
| Composition Chimique | HTA | BTA | MTA | BTA |
| Alumina (Al2O3) % | 68.7-70.5 | 38.0-41.0 | 50.8-54.2 | 37.5-41 |
| Lime (CaO) % | 28.5-30.5 | 35.3-37.9 | 35.9-38.9 | 35.5-39 |
| Silica (SiO2) % | 0.2-0.6 | 3.5-5.0 | 4.0-5.5 | 3.5-5.5 |
| Iron (Fe2O3) % | 0.1-0.3 | 14.5-17.5 | 1.5-2.5 | 13-17.5 |
| Blaine - SSB (cm2/g) | 3800-4400 | 2950-3350 | 3750-4250 | 2850-3450 |

II. Preparation Method

The mixing conditions as well as the introduction order of the components enable to substantially improve the aqueous suspension quality. Preferably, the components are mixed together in the following order:
1) Solvent,
2) Blocking agent
3) Dispersant
4) Cement
5) Rheological agent
6) Biocidal agent The mixing procedure is as follows:
weight the required amount of water and introduce water into a mixing tank (bowl), set stirring at 1000 rpm, blade in upper position,
add the blocking agent (or inhibitor), mix until dissolution of the blocking agent (maximum 3 min),
add the following component, i.e. the dispersant,
add the one or more hydraulic binder(s), during incorporation, the blade is positioned on the surface of the aqueous suspension so as to optimize the dispersion,
mix for about 1 minute, with the blade in upper position,
increase the rate to 3000 rpm and add the last components,
turn the mixer off, scrape the bowl walls as well as the blade to remove the residual deposits,
mix for 15 minutes at a high speed, blade in lower position.

It should be noted that these preparation conditions enable to efficiently disperse and homogenize the aqueous suspension.

B. Characterization

I. An Aqueous Suspension or Mineral Slurry Based on Ternal® White

| Dosage (%)* | Slurry 1 | Slurry 2 | Slurry 3 | Slurry 4 | Slurry 5 |
|---|---|---|---|---|---|
| Solvent | 36.925 | 38.115 | 39.005 | 38.805 | 38.305 |
| Inhibitor (blocking agent): | | | | | |
| Boric acid | 2.38 | — | — | — | — |
| Phosphoric acid (diluted to 85%) | — | 1.19 | 0.3 | 0.5 | 1 |
| Dispersant | 1 | 1 | 1 | 1 | 1 |
| Cement | 59.38 | 59.38 | 59.38 | 59.38 | 59.38 |
| Rheological agent | 0.3 | 0.3 | 0.3 | 0.3 | 0.3 |
| Biocidal agent | 0.015 | 0.015 | 0.015 | 0.015 | 0.015 |
| Total | 100% | 100% | 100% | 100% | 100% |

*The defined amounts are expressed in weight relative to the aqueous suspension total weight.

1. Stability Monitoring Through the pH Value Measurement

Measuring the pH value is a good way to monitor the stability of an aqueous suspension. A boric acid-stabilized aqueous suspension is considered to be unstable if its pH value significantly increases and/or reaches the pKa of boric acid (pKa=9.2). From this value, the hydraulic setting is initiated.

Figure 2:
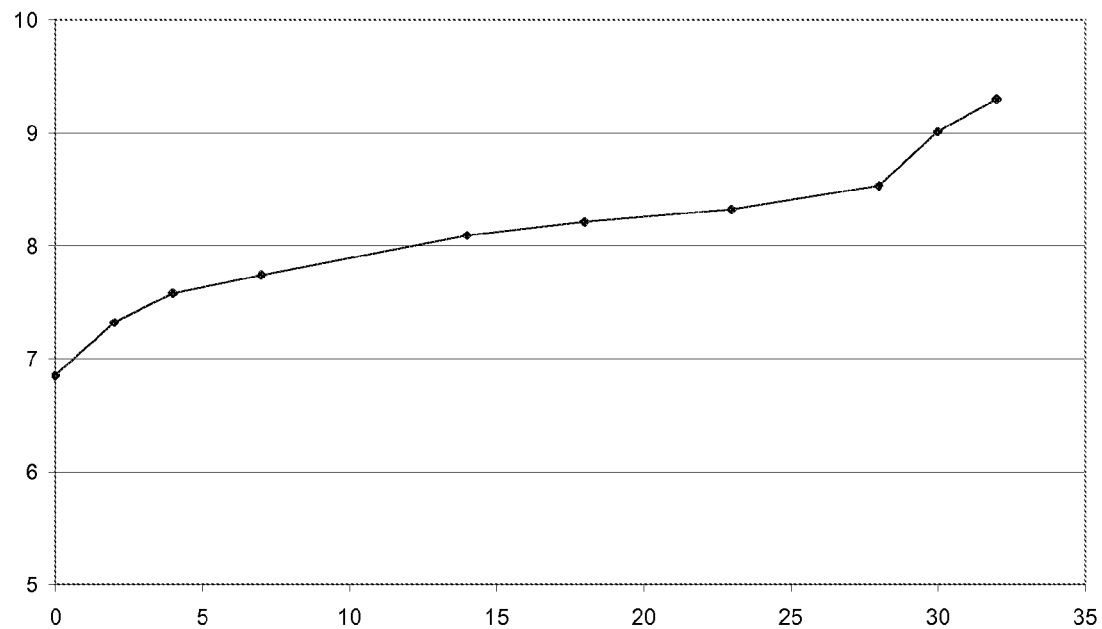
FIG. 2 shows the pH evolution for an aqueous suspension kept at 50° C.

FIGS. 1 and 2 illustrate for Slurry 1, the pH evolution as a function of time (in days). FIG. 1 shows the pH evolution of an aqueous suspension kept at room temperature and FIG. 2 shows the pH evolution for an aqueous suspension kept at 50° C.

At room temperature, Slurry 1 initial pH is around 8, over the months, it is gradually increasing up to the threshold value 9. Within the range 8<pH<9, Slurry 1 is stable over several months. By contrast, at a temperature of 50° C., such mechanism is clearly accelerated. Indeed, the increase in the pH value can be observed from the very first days of storage, the threshold value of 9.2 is attained after 30 days, Slurry 1 is setting on day 32.

The storage time for slurries stabilized with boric acid exceeds easily 6 months when stored at room temperature. By contrast, as soon as the storage conditions vary (temperature=50° C.), storage times are significantly reduced.

Figure 3:
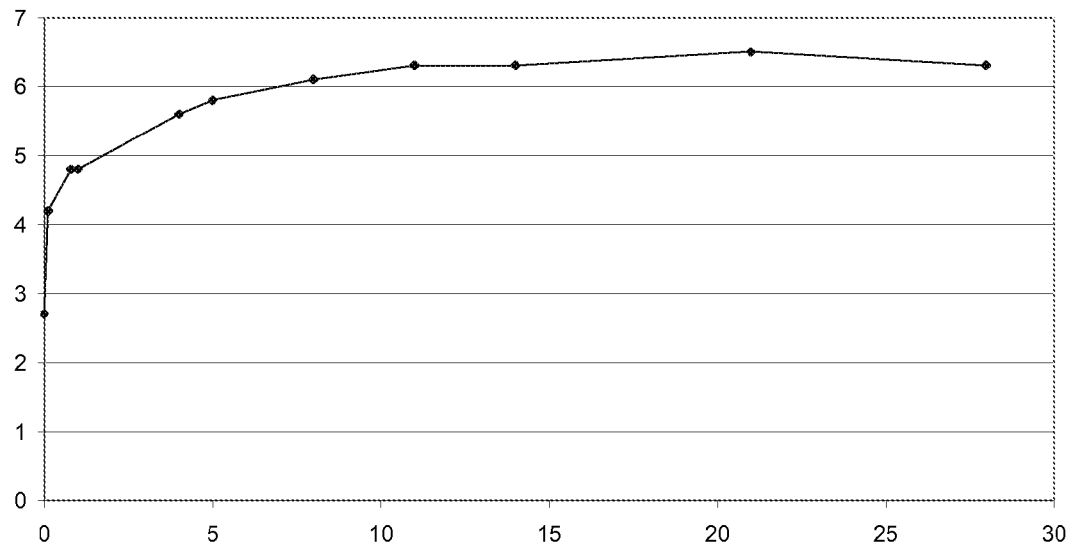
FIG. 3 shows the pH evolution of an aqueous suspension kept at room temperature.
Figure 4:
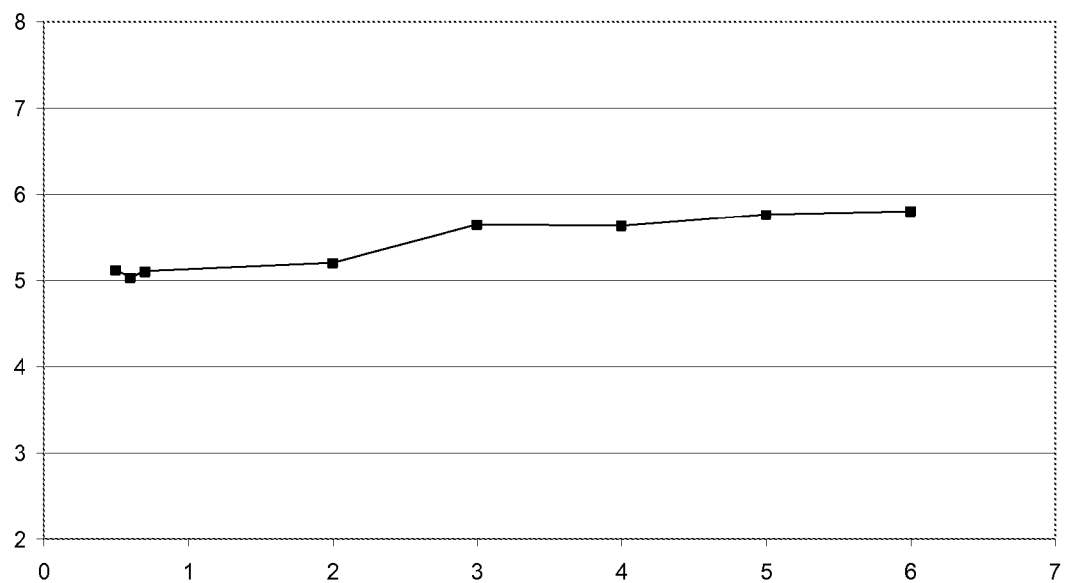
FIG. 4 shows the pH evolution of an aqueous suspension kept at 50° C.

FIGS. 3 and 4 illustrate for Slurry 2, the pH evolution as a function of time in days (FIG. 3) and in months (FIG. 4). FIG. 3 shows the pH evolution of an aqueous suspension kept at room temperature and FIG. 4 shows the pH evolution of an aqueous suspension kept at 50° C.

At room temperature, the Slurry 2 initial pH is around 4. A gradual rise is thereafter observed within a time period of 10 days, the pH values stabilizing around 6.4. At this value, the slurry is perfectly stable.

At a temperature of 50° C., the pH value remains very constant and centered around a value ranging from 5 to 6 pH units. With such pH, Slurry 2 is perfectly stable even after 45 days of storage at 50° C. This is confirmed through FIG. 4 showing the pH monitoring at 50° C. effected during the 6 last months. The results show that the pH value does not change, Slurry 2 is perfectly stable after 6 months of storage at 50° C., no setting can be observed.

2. Concentration Optimization

Figure 5:
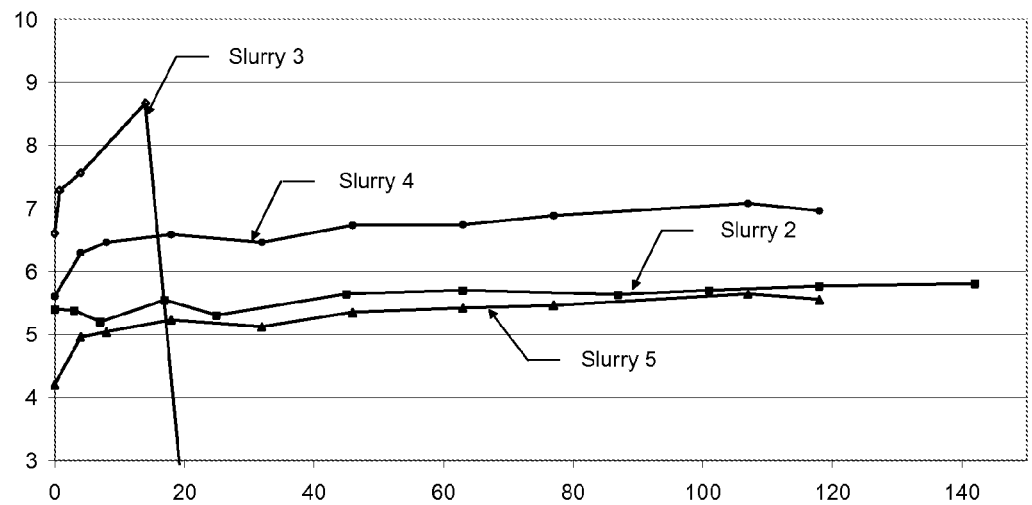
FIG. 5 illustrates the pH evolution as a function of time (in days) for Slurries 2 to 5 prepared in the Example kept at 50° C.

FIG. 5 illustrates for Slurries 2 to 5 kept at 50° C., the pH evolution as a function of time (in days). It can be observed that when using phosphoric acid as a stabilizer, the amounts of phosphoric acid may be lowered to less than 0.5% by weight relative to the aqueous suspension total weight, while retaining a proper stability time at 50° C.

II. Aqueous Suspensions Based on Ettringite Systems

1. Preparation of the Compositions

Figure 7:
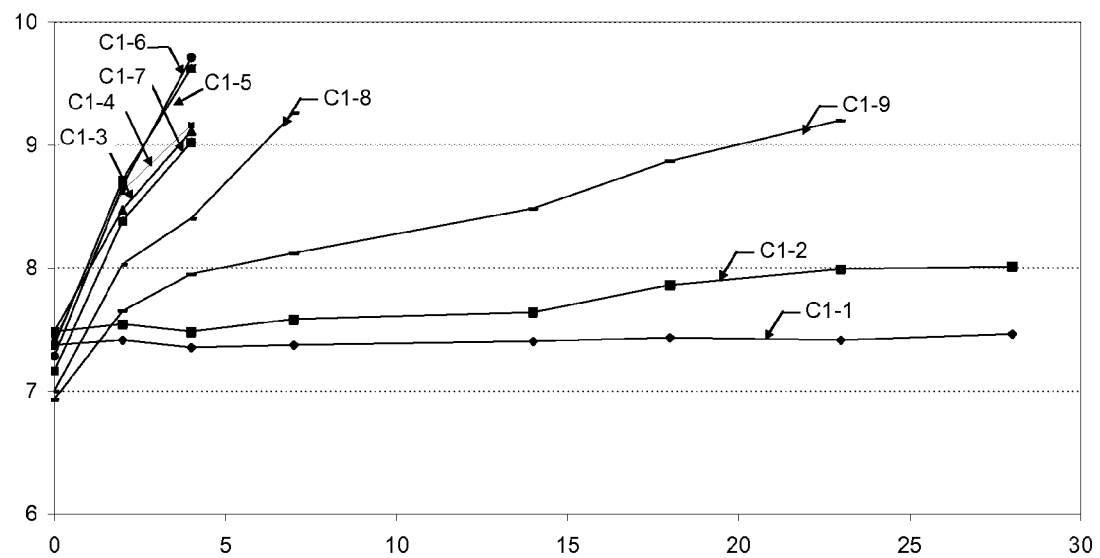
FIG. 7 shows the pH monitoring for compositions from the Example as a function of time (days).

In these assays, various <<ettringite-based slurries>> were obtained by varying sulfate rates and the type of sulfate used. The stabilizing system used is phosphoric acid dosed at 1.2% by weight relative to the aqueous suspension total weight. The aluminous cement used is Ternal® White. The hydraulic binder rate in the aqueous suspension is 60% by weight relative to the aqueous suspension total weight.

and the pH regularly measured. FIG. 7 shows the pH monitoring for some of these compositions as a function of time (days). It can be observed that after a 28 day-period of storage at 50° C., only compositions C1-1 and C1-2 retain pH values lower than 9.2 and thus are perfectly stable. All the other compositions do present a setting before day 28. The stability range of the composition mixtures based on suspensions stabilized with boric acid is therefore drastically reduced and enables to introduce maximum 20% by weight of Slurry 1 into the binding composition.

The storage time for slurries stabilized with boric acid exceeds easily 6 months when stored at room temperature. By contrast, as soon as the chemical environment is modified, for example through admixture of latexes, storage times are significantly lowered.

Figure 8:
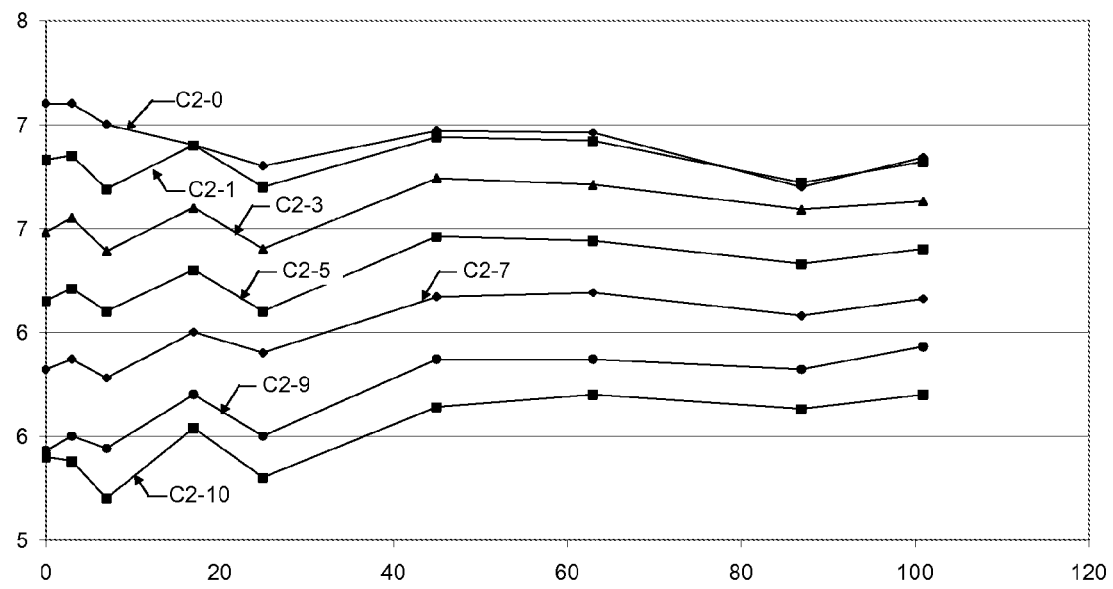
FIG. 8 shows the pH monitoring for various compositions from the Example as a function of time (days).

The stability at 50° C. for compositions C2-0 to C2-10 was also characterized. The compositions were stored at 50° C. and the pH values regularly measured. FIG. 8 shows the pH monitoring for these various compositions as a function of time (days).

|  | Slurry (Dosage (%)*) | | | | | |
|---|---|---|---|---|---|---|
|  | A | B | C | D | E | F |
| Solvent | 37.485 | 37.485 | 37.485 | 37.485 | 37.485 | 37.485 |
| Phosphoric acid diluted to 85% | 1.2 | 1.2 | 1.2 | 1.2 | 1.2 | 1.2 |
| Dispersant | 1 | 1 | 1 | 1 | 1 | 1 |
| Cement: | | | | | | |
| Ternal ® white | 42 | 42 | 51 | 51 | 57 | 57 |
| anhydrite | 18 | — | 9 | — | 3 | — |
| semihydrate | — | 18 | — | 9 | — | 3 |
| Rheological agent | 0.30 | 0.3 | 0.3 | 0.3 | 0.3 | 0.3 |
| Biocidal agent | 0.015 | 0.015 | 0.015 | 0.015 | 0.015 | 0.015 |
| Total | 100% | 100% | 100% | 100% | 100% | 100% |

Figure 6:
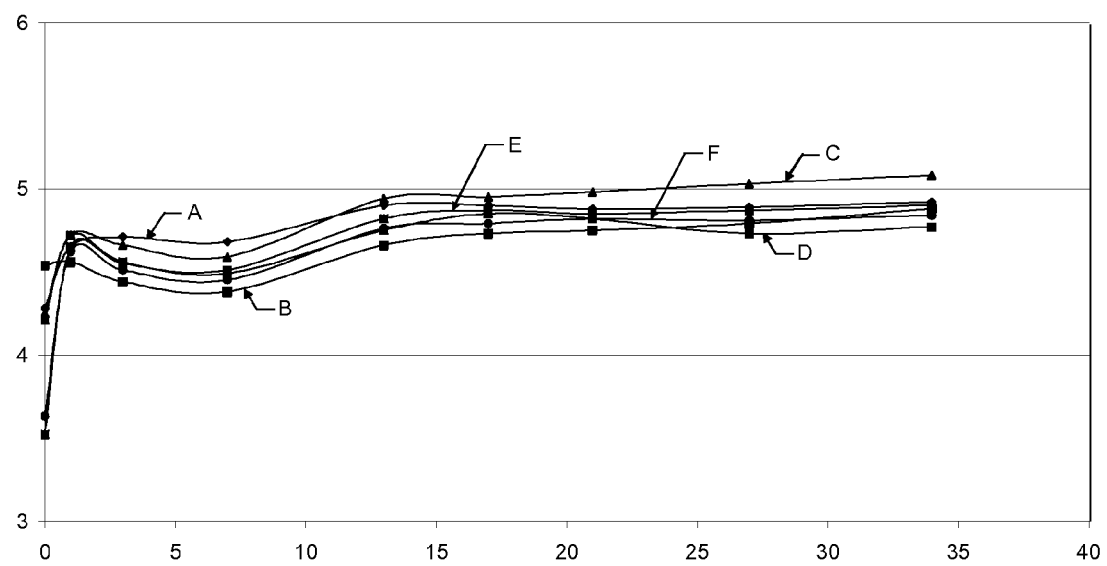
FIG. 6 illustrates the pH evolution as a function of time (in days) for Slurries A to F from the Example kept at 50° C.

FIG. 6 illustrates for Slurries A to F kept at 50° C., the pH evolution as a function of time (in days). The pH evolution monitoring confirms that all the ettringite-based slurries are perfectly stabilized with phosphoric acid.

III. Binding Compositions Based on an Aqueous Suspension-Organic Binder Combination 1. Preparation of the Compositions In these assays, Slurries 1 and 2 are used, that have been stabilized respectively with boric acid and phosphoric acid and one organic binder of the latex type.

| Composition | % of Slurry 1 | % of organic binder | Composition | % of Slurry 2 | % of organic binder |
|---|---|---|---|---|---|
| C1-0 | 0 | 100 | C2-0 | 0 | 100 |
| C1-1 | 10 | 90 | C2-1 | 10 | 90 |
| C1-2 | 20 | 80 | C2-2 | 20 | 80 |
| C1-3 | 30 | 70 | C2-3 | 30 | 70 |
| C1-4 | 40 | 60 | C2-4 | 40 | 60 |
| C1-5 | 50 | 50 | C2-5 | 50 | 50 |
| C1-6 | 60 | 40 | C2-6 | 60 | 40 |
| C1-7 | 70 | 30 | C2-7 | 70 | 30 |
| C1-8 | 80 | 20 | C2-8 | 80 | 20 |
| C1-9 | 90 | 10 | C2-9 | 90 | 10 |
| C1-10 | 100 | 0 | C2-10 | 100 | 0 |

2. Characterization

The stability at 50° C. of compositions C1-0 to C1-10 has been characterized. The compositions were stored at 50° C.

The results obtained show very stable pH values within a range of from 5 to 7 pH units for more than 40 days. There was no setting observed for none of the mixtures during this time period.

To conclude, slurries stabilized with phosphoric acid show very good results whatever the temperature of storage and the chemical environment of the slurry as compared to slurries stabilized with boric acid. These results were obtained for acid/binder ratios:2. All these data as a whole demonstrate the interest to stabilize calcium aluminate-based slurries with phosphoric acid.

IV. Aqueous Suspensions Based on Other Aluminous Cements

1. Preparation of the Compositions

| Slurries (Dosage (%)*) | Slurry 6 | Slurry 7 | Slurry 8 | Slurry 9 |
|---|---|---|---|---|
| Solvent | 36.185 | 33.685 | 36.185 | 33.685 |
| Phosphoric acid (diluted to 85%) | 2.5 | 5 | 2.5 | 5 |
| Dispersant | 1 | 1 | 1 | 1 |
| Cement: | | | | |
| Ternal ® RG | | | 60 | 60 |
| SECAR 51 | 60 | 60 | — | — |
| Rheological agent | 0.3 | 0.3 | 0.3 | 0.3 |
| Biocidal agent | 0.015 | 0.015 | 0.015 | 0.015 |
| Total | 100% | 100% | 100% | 100% |

2. Stability Monitoring

Figure 9:
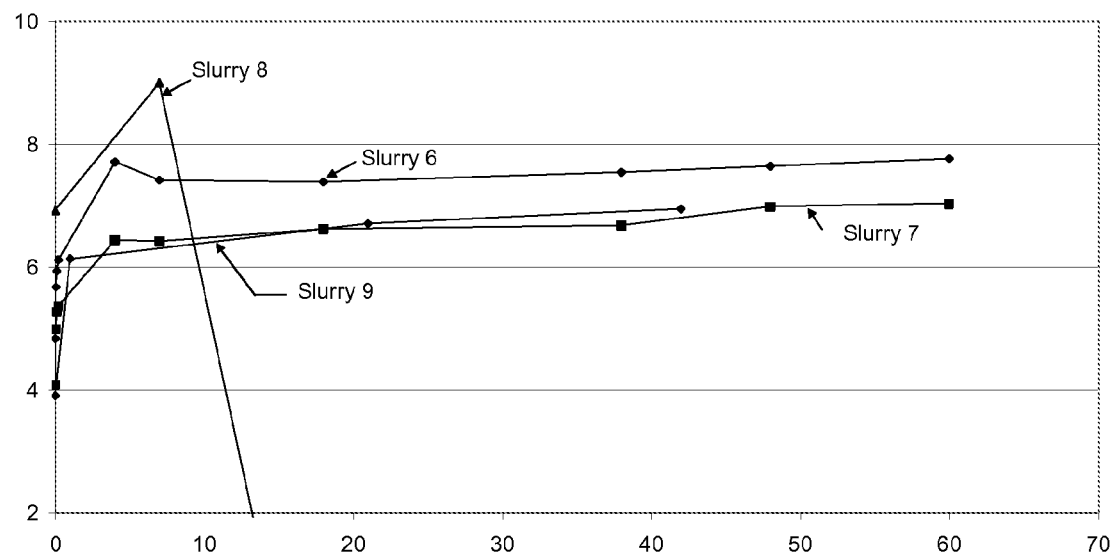
FIG. 9 illustrates for Slurries 6 to 9 prepared in the Example kept at 50° C., the pH evolution as a function of time (in days).

FIG. 9 illustrates for Slurries 6 to 9 kept at 50° C., the pH evolution as a function of time (in days). As regards slurries based on Secar® 51 (6 and 7), it could be observed that whatever the dosage of phosphoric acid used (2.5% or 5% depending on the aqueous suspension, i.e. 3.5% or 7% by calculating the percentage as a function of the hydraulic binder weight), the pH is stable for 2 months (60 days). By contrast, for slurries based on Ternal® RG (8 and 9), it could be observed that the dosage of phosphoric acid used, i.e. 2.5% or 5% depending on the aqueous suspension (i.e. 3.5% or 7% by calculating the percentage as a function of the hydraulic binder weight) has an influence on the slurry stability. With a 7% dosage by calculating the percentage as a function of the hydraulic binder weight, a good stability of the slurry could be observed for 1.5 month (45 days). In conclusion, it could be seen that when using phosphoric acid as a blocking agent, these slurries may be stabilized for periods ranging from 20 days to 2 months depending on the phosphoric acid dosage and the aluminous cement type associated therewith.

V. Use of a Phosphonic Acid/Phosphoric Acid/Citric Acid Combined System

In these assays, a combination of phosphonic acid, phosphoric acid and carboxylic acid, i. e. citric acid, was used. This product Dequest® 2000 corresponds to ATMP (amino trimethylene phosphonic acid).

1. Composition Tested

| Slurries Dosage (%)* | Slurry 10 | Slurry 11 | Slurry 12 |
|---|---|---|---|
| Solvent | 34.79 | 34.94 | 34.54 |
| Phosphoric acid (diluted to 85%) | 1 | 1.6 | 1.8175 |
| Dequest ® 2000 | 2.4 | 1.5 | 1.325 |
| Citric acid | 0.5 | 0.65 | 1 |
| Dispersant | 1 | 1 | 1 |
| Cement: SECAR ® 51 | 60 | 60 | 60 |
| Rheological agent | 0.3 | 0.3 | 0.3 |
| Biocidal agent | 0.015 | 0.015 | 0.015 |
| Total | 100% | 100% | 100% |

2. Stability Monitoring

Figure 10:
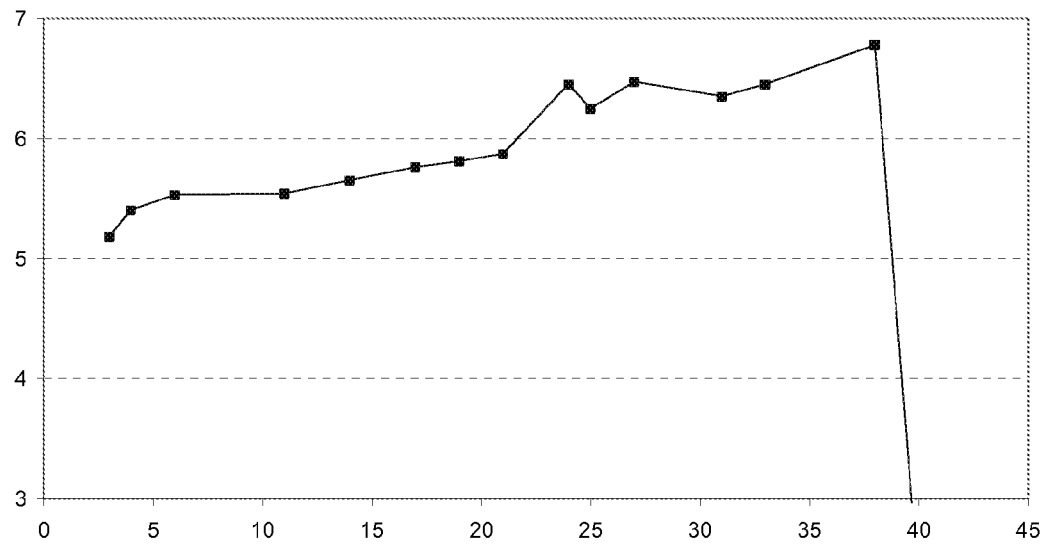
FIGS. 10 to 12 illustrate for Slurries 10 to 12, respectively, from the Example, kept at 50° C., the pH evolution as a function of time (in days).
Figure 11:
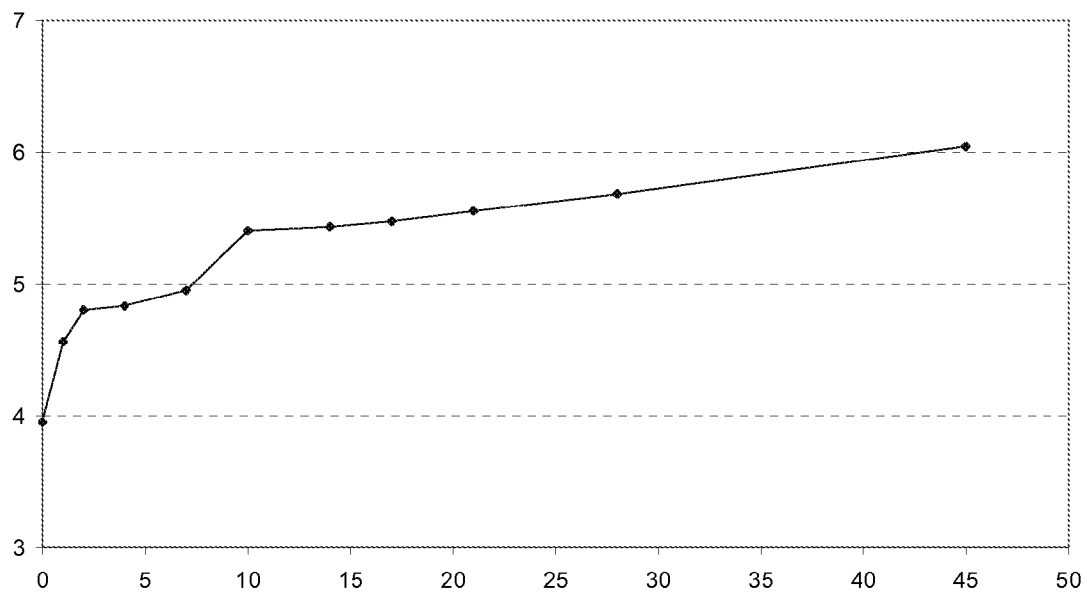
Figure 12:
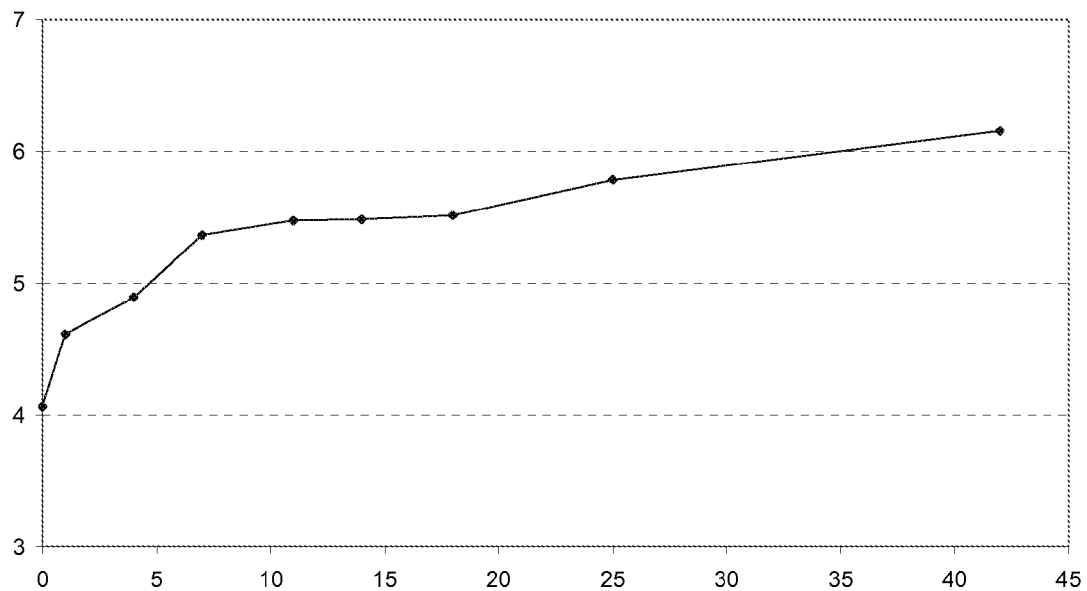

FIGS. 10 to 12 illustrate for Slurries 10 to 12 respectively, kept at 50° C., the pH evolution as a function of time (in days). On these figures, the pH monitoring shows a first area, which corresponds to a very slight rise of the pH level, which stops on day 25, thereafter a gradual rise of the pH level, which results from the start of slurry destabilization. However, it can be observed that when using the combination of the three blocking agents, a good stability can be obtained in the system for about 45 days at 50°.

The invention claimed is:

1. A stabilized aqueous suspension, comprising:
    from 50% to 70% by weight, relative to the total weight of said aqueous suspension at least one hydraulic binder comprising aluminous cement and/or calcium sulfoaluminous cement and at least one blocking agent comprising a phosphorus-containing compound selected from the group consisting of metaphosphoric acid, phosphorous acid, phosphoric acid, phosphonic acids and any compound which may form any of these compounds by reacting with water, said suspension comprising from 0.1% to 20% by weight of phosphorus-containing compound relative to the aluminous cement and/or calcium sulfoaluminous cement total weight,
    from 30% to 50%, by weight, relative to the total weight of said aqueous suspension of water, and
    from 0 to 5%, by weight, relative to the total weight of said aqueous suspension of additional additives,
    wherein said stabilized aqueous suspension is stabilized for at least two months at a temperature from about 15° C. to 55° C.

2. The stabilized aqueous suspension according to claim 1, wherein compounds which may form metaphosphoric acid, phosphorous acid, phosphoric acid or phosphonic acids are selected from the group consisting of: phosphorus pentoxyde, pyrophosphoric acid, tripolyphosphoric acid, amino trimethylene phosphonic acid, 2-aminoethyl phosphonic acid, 1-hydroxy ethylidene-1,1-diphosphonic acid, ethylene diamine tetramethylene phosphonic acid, tetramethylene diamine tetramethylene phosphonic acid, hexamethylene diamine tetramethylene phosphonic acid, diethylene triamine pentamethylene phosphonic acid, phosphonobutane tricarboxylic acid, N-(phosphonomethyl)iminodiacetic acid, 2-carboxyethyl phosphonic acid, and 2-hydroxy phosphonocarboxylic acid.

3. The stabilized aqueous suspension according to claim 1, wherein said aqueous suspension has a pH value lower than 9.

4. The stabilized aqueous suspension according to claim 1, wherein the aluminous cement is an alumina high-content aluminous cement with an alumina content of more than 60% by weight relative to the aluminous cement total weight and the suspension comprises from 0.5 to 20% by weight of a phosphorus-containing compound relative to the alumina high-content aluminous cement total weight.

5. The stabilized aqueous suspension according to claim 1, wherein the aluminous cement is an alumina intermediate-content aluminous cement with an alumina content ranging from 45 to 60% by weight relative to the aluminous cement total weight and the suspension comprises from 2 to 20% by weight of a phosphorus-containing compound relative to the alumina intermediate-content aluminous cement total weight.

6. The stabilized aqueous suspension according to claim 1, wherein the aluminous cement is an alumina low-content aluminous cement with an alumina content of less than 45% by weight relative to the aluminous cement total weight and the suspension comprises from 5 to 20% by weight of a phosphorus-containing compound relative to the alumina low-content aluminous cement total weight.

7. The stabilized aqueous suspension according to claim 1, wherein said aqueous suspension further comprises another blocking agent selected from carboxylic acids.

8. The stabilized aqueous suspension according to claim 1, wherein said aqueous suspension comprises by weight relative to the total weight of said aqueous suspension:
    from 55 to 65% of aluminous cement,
    from 35 to 45% of water, and
    from 0 to 5% of additional additives.

9. The stabilized aqueous suspension according to claim 4, wherein the aluminous cement has the following chemical composition, by weight relative to the aluminous cement total weight:
    $Al_2O_3$: >60%,
    $CaO$: >25%,
    $SiO_2$: <5%, and
    $Fe_2O_3$: <10%.

10. The stabilized aqueous suspension according to claim 1, wherein the hydraulic binder further comprises calcium sulphates.

11. The stabilized aqueous suspension according to claim 1, wherein the aqueous suspension solid content is higher than 50%.

12. A method for preparing a stabilized aqueous suspension according to claim 1, comprising the following steps of:
introducing water into a mixing tank,
stirring,
adding the phosphorus-containing compound,
optionally adding the one or more dispersant(s),
adding the one or more hydraulic binder(s),
maintaining the stirring and,
optionally adding the other components,
stirring for at least 5 minutes.

13. A method for retarding for at least two months at a temperature ranging from about 15° C. to 55° C. the setting of a stabilized aqueous suspension comprising:
from 50% to 70%, by weight, relative to the total weight of said aqueous suspension of at least one hydraulic binder, the hydraulic binder comprising at least one aluminous cement,
from 30% to 50%, by weight, relative the total weight of said aqueous suspension of water, and
from 0 to 5%, by weight, relative to the total weight of said aqueous suspension of additional additives,
said method comprising: adding to said aqueous suspension, at least one phosphorus-containing compound selected from the group consisting of metaphosphoric acid, phosphorous acid, phosphoric acid, phosphonic acids and any compound which may form any of metaphosphoric acid, phosphorous acid, phosphoric acid, and phosphonic acids by reacting with water, said phosphorus-containing compound representing from 0.1 to 20% by weight relative to the aluminous cement total weight.

14. A binding composition comprising:
(i) a stabilized aqueous suspension according to claim 1, and
(ii) at least one organic binder.

15. The stabilized aqueous suspension according to claim 9, wherein the aluminous cement has the following chemical composition, by weight relative to the aluminous cement total weight:
$Al_2O_3$: ranging from 60-75%,
CaO: ranging from 25-50%,
$SiO_2$: <4%, and
$Fe_2O_3$: <5%.

16. The stabilized aqueous suspension according to claim 7, wherein said aqueous suspension comprises a combination of:
at least one phosphonic acid,
at least one compound selected from the group consisting of metaphosphoric acid, phosphorous acid, phosphoric acid and any compound which may form any of these compounds by reacting with water, and
at least one carboxylic acid.

17. The stabilized aqueous suspension according to claim 3, wherein said aqueous suspension has a pH value lower than 8.

18. The stabilized aqueous suspension according to claim 3, wherein said aqueous suspension has a pH value lower than 7.

19. The stabilized aqueous suspension according to claim 3, wherein said aqueous suspension has a pH value lower than 6.5.

20. The stabilized aqueous suspension according to claim 1, wherein the phosphorous containing compound has a pka of less than 9.

21. The stabilized aqueous suspension according to claim 1, wherein the phosphorous containing compound has a pka of less than 8.

22. The stabilized aqueous suspension according to claim 1, wherein the phosphorous containing compound has a pka of less than 7.

23. The stabilized aqueous suspension according to claim 1, wherein the phosphorous containing compound has a pka of less than 6.8.

24. The stabilized aqueous suspension according to claim 10, wherein the hydraulic binder comprises by weight, relative to the aqueous suspension total weight, from 5 to 30% of calcium sulphates.

25. The stabilized aqueous suspension according to claim 10, wherein the hydraulic binder of the aqueous suspension comprises by weight relative to the total weight of the hydraulic binder-forming components:
from 0 to 50% of calcium sulphates, and
from 50 to 100% of aluminous cement.

26. The stabilized aqueous suspension according to claim 25, wherein the hydraulic binder of the aqueous suspension comprises by weight relative to the total weight of the hydraulic binder-forming components:
from 1 to 35% of calcium sulphates, and
from 50 to 99% of aluminous cement.

27. The stabilized aqueous suspension according to claim 25, wherein the hydraulic binder of the aqueous suspension comprises by weight relative to the total weight of the hydraulic binder-forming components:
from 5 to 30% of calcium sulphates, and
from 70 to 95% of aluminous cement.

* * * * *